United States Patent [19]

Dragoset, Jr.

[11] Patent Number: 5,448,531
[45] Date of Patent: Sep. 5, 1995

[54] METHOD FOR ATTENUATING COHERENT NOISE IN MARINE SEISMIC DATA

[75] Inventor: William H. Dragoset, Jr., Houston, Tex.

[73] Assignee: Western Atlas International, Houston, Tex.

[21] Appl. No.: 238,426

[22] Filed: May 5, 1994

[51] Int. Cl.[6] .......................... G01V 1/36; G01V 1/38
[52] U.S. Cl. ........................ 367/45; 367/21; 367/24; 367/73; 364/421
[58] Field of Search ............... 367/21, 24, 421, 45, 367/45, 73; 364/421

[56] References Cited

U.S. PATENT DOCUMENTS

| | | | |
|---|---|---|---|
| 4,630,246 | 12/1986 | Fogler | 367/135 |
| 4,750,156 | 6/1988 | Abrams et al. | 367/42 |
| 4,890,264 | 12/1989 | Crews | 367/45 |
| 4,935,904 | 6/1990 | Chambers et al. | 367/38 |
| 4,964,087 | 10/1990 | Widrow | 367/45 |
| 5,050,226 | 9/1991 | Collet-Billon | 382/54 |
| 5,237,538 | 8/1993 | Linville et al. | 367/38 |
| 5,251,183 | 10/1993 | McConnell | 367/21 |
| 5,365,492 | 11/1994 | Dragoset | 367/21 |
| 5,400,299 | 3/1995 | Trantham | 367/38 |

OTHER PUBLICATIONS

Linville et al, Geophysics, vol. 60, #1, pp. 191–203, Jan. 2, 1995; Abst. only herewith.

*Primary Examiner*—Nelson Moskowitz
*Attorney, Agent, or Firm*—William A. Knox

[57] ABSTRACT

A method for adaptively creating a filter for removing coherent environmental noise from a multitrace digitized seismic recording requires the presence, on the recording, of a limited sample of pure noise that is uncontaminated by desired signal. The pure noise sample is used to discover the location of the noise source and from that discovery, to extrapolate and reconstruct the characteristics of the noise envelope as it would appear on the seismic recording. The reconstructed noise envelope is used as a noise reference for input to a conventional iterative adaptive noise cancellation filter loop. For stability, the loop gain is minimized by temporally and spatially averaging the filter coefficients for each sample interval.

7 Claims, 4 Drawing Sheets

METHOD FOR ATTENUATING COHERENT NOISE IN MARINE SEISMIC DATA

BACKGROUND OF THE INVENTION

1. Field of the Invention

In the special case where continuous coherent-noise events stand out clearly prior to the arrival of the desired seismic-energy, an adaptive noise cancellation filter (ANC) can be empirically created to provide a reference model of the noise. The undesired continuous coherent noise that contaminates the seismic data is removed by ANC filtering.

2. Discussion of Related Art

In the art of marine seismic geophysical exploration, a plurality of seismic-signal sensors are secured at regular intervals to a long streamer cable of any well-known type which may be 10,000 feet long or more. The streamer cable includes a plurality of electrical-signal communication channels and means for rendering the streamer cable neutrally buoyant. The streamer cable and its attached sensors are towed along a line of survey, just beneath the water surface, typically 30 feet, at a desired constant velocity such as six knots. At timed intervals, such as every six seconds, an acoustic source emits a wavefield that propagates downwardly to insonify the sea floor and sub-bottom earth formations. The wavefield is reflected from the respective formation-boundary interfaces, whence the reflected wavefields return to the near-surface sensors. The variations in mechanical motion or water pressure due to the reflected acoustic waves are converted to electrical analog signals by the sensors. The analog signals are digitized and transmitted through the streamer cable communications links to well-known recording equipment aboard the towing ship. There, the digital data are recorded for archival study as time scale recordings on magnetic tape, diskettes, CD ROM devices or any other state-of-the-art recording/reproducing equipment.

As is well known, when an acoustic source is activated, the first-arriving impulse at the sensors closest to the source travels by a direct path through the water from the source to the sensor following a time delay proportional to the source-sensor distance divided by the water velocity which is about 5000 feet per second. In most cases, the time delay to the nearest sensor may be a few hundredths to a tenth of a second. At increasing sensor distances from the source, the first-arriving seismic signals are increasingly delayed. Sensors from the mid- to the far end-points of a two-mile-long cable may remain quiet for two or more seconds before the desired seismic signals arrive.

All seismic signals contain information of some sort. Sought-after seismic signals are those that can be correlated continuously over extended regions and that provide a quantitative measure of the attributes of sub-ocean earth strata.

Incoherent seismic signals that offer only random, non-continuous bits of information are considered to be noise signals that must be removed from the sought-after signals. Incoherent noise signals originate from sources such as, but not limited to vehicular, pedestrian or bestial traffic, surface water waves, surging of the streamer cable and sparkling noise emanating from virtual point sources located on a rugose sea floor. That sort of noise can usually be removed during routine data processing using well-known destructive random-waveform cancellation techniques.

Noise may also be coherent and correlatable over a limited region but nevertheless undesirable. Such noises include water column reverberation, the regular pulsations of own or other ships' screws, acoustic wavefields generated by a competing geophysical exploration crew, voices of marine life such as whales, noise due to near-surface scatterers or machine noise from offshore oil rigs. Various methods are known for removing such noise including stacking, f-k filtering, array-forming, beam steering and vertical or lateral averaging or a combination of both.

Coherent noise due to competing geophysical exploration ships may be suppressed by reformatting common shot gathers into common receiver gathers as taught by U.S. Pat. No. 4,937,794, issued Jun. 26, 1990 to R. A. Marschall et al. and assigned to the assignee of this invention. Pairs of seismic traces from a common receiver gather are corrected for differential moveout, weighted in inverse proportion to the RMS signal power and combined to generate compressed common receiver gathers. The compressed common receiver gathers may be reformatted as common midpoint gathers for further processing.

U.S. Pat. No. 5,293,352, issued Mar. 8, 1994 to Robert E. Chambers and assigned to the assignee of this invention, teaches a method for removing noise due to near surface scatterers by resorting a set of raw common shot gathers into common receiver gathers. The wavefield envelopes from the common receiver gathers are migrated using one half the near surface velocity to provide migrated data sets. The migrated data sets are resorted back into common shot gathers and are subtracted from the original raw common shot gathers to provide noise-free data sets.

U.S. patent application Ser. No. 08/101,949, filed Aug. 04, 1993 in the name of William H. Dragoset and now U.S. Pat. No. 5,365,492, issued Nov. 15, 1994, assigned to the assignee of this invention discloses an adaptive noise cancellation method for ridding seismic recordings of reverberation noise. The signals detected by a pressure sensor are subtracted from the signals detected by a motion sensor to derive a difference signal. The normalized amplitude of the difference signal is the level of the noise contribution to the total signal. The difference signal is then subtracted from the total signal to reveal the desired noise-free signal.

Other filtering methods that are known include certain image enhancement techniques such as described by J. Besag in *On the Statistical Analysis of Dirty Pictures*, published in the Journal of the Royal Statistical Society, v. 48, n, 3, 1986.

The first two patents require a considerable quantity of computer resources for implementation. The Dragoset Application not only requires a large amount of computer-aided calculation, but it also requires the use of double the number of sensors normally needed for exploration in order to get an independent reference-noise measurement.

In certain special cases involving continuous, coherent noise such as that due to a passing ship or due to a drilling rig, it is possible to employ a somewhat simpler adaptive noise cancellation process than the ones cited above. There is a need for an adaptive noise cancellation process having the capability to derive a reference model of the noise from data extracted from the seismic shot record itself.

SUMMARY OF THE INVENTION

An adaptive filter for removing coherent environmental noise from a multitrace seismic data recording is proposed wherein the recording consists of a series of discrete data samples. The method for formulating the filter consists of identifying components of a noise wavefield which are not contaminated by desired seismic data and which may be found within an analysis window having temporal and spatial boundaries. The analysis window includes a set of a selected sub-multiple of traces along a spatial coordinate and a limited number of data samples along the temporal coordinate. A reference trace segment is selected from among the traces within the analysis window. The reference trace segment is cross-correlated with each of the other traces to measure the stepout of the wavefield components as a function of trace separation from the reference trace. Using the stepout values from the respective traces, the location of the noise source is determined by use of a least squares inversion algorithm. From the source location, the envelopes of the noise wavefield components are extrapolated to the non-selected traces of the multitrace seismic data recording.

The noise reference segment is appended to itself until a noise reference is synthesized having a length equal to the time duration of the seismic data recording. Sets of filter coefficients are adaptively calculated for each sample of the noise reference trace. The sets of filter coefficients are stored in memory locations. For all traces except the first or reference trace, the filter coefficients used at each time sample are a linear combination of the coefficients used for the previous time sample of that trace and the shifted, stored coefficients from the previous trace. The resulting filter is applied to the multitrace seismic data recording.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
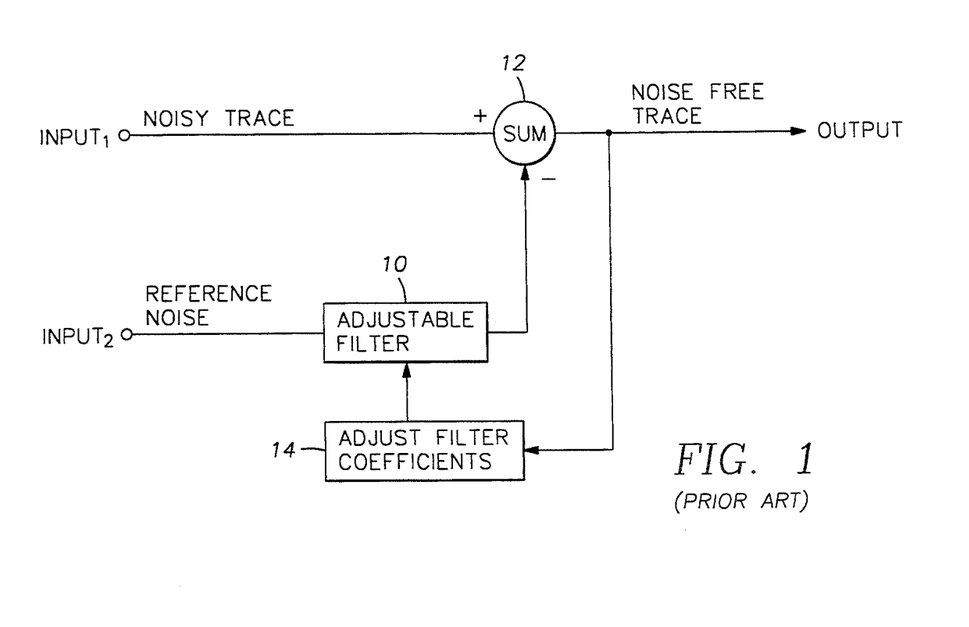
FIG. 1 is a schematic diagram of a conventional Adaptive Noise Cancellation filter.

Adaptive noise cancellation (ANC) filters for various applications are well known. See for example, *Adaptive Signal Processing* by Windrow and Stearns, Prentice-Hall, 1985. FIG. 1 is presented to illustrate an elementary ANC filter which operates as follows:

The filter has two inputs, input 1 is a noisy signal; input 2 is a noise reference. It is assumed that the noise contaminating the output signal can be obtained by convolving the reference noise with some set of filter coefficients. The filter coefficients are unknown and may vary in time. It is the purpose of the ANC filter to discover the coefficients that match the reference noise to the contaminating noise so that the noise can be subtracted from the output signal. In accordance with FIG. 1, the filtered reference noise from adjustable filter 10 is subtracted from the signal in summing junction 12. The signal plus residual noise is fed back through filter coefficient processor 14 and compared to the reference noise whence adjusted filter coefficients are fed back into filter 10. The process is repeated until the filter coefficients converge to a stable value. The gain of the feedback loop must be such that the filter that matches the reference noise to the contaminating noise changes slowly with respect to the sampling interval of the two inputs, otherwise the filter becomes unstable.

Figure 2:
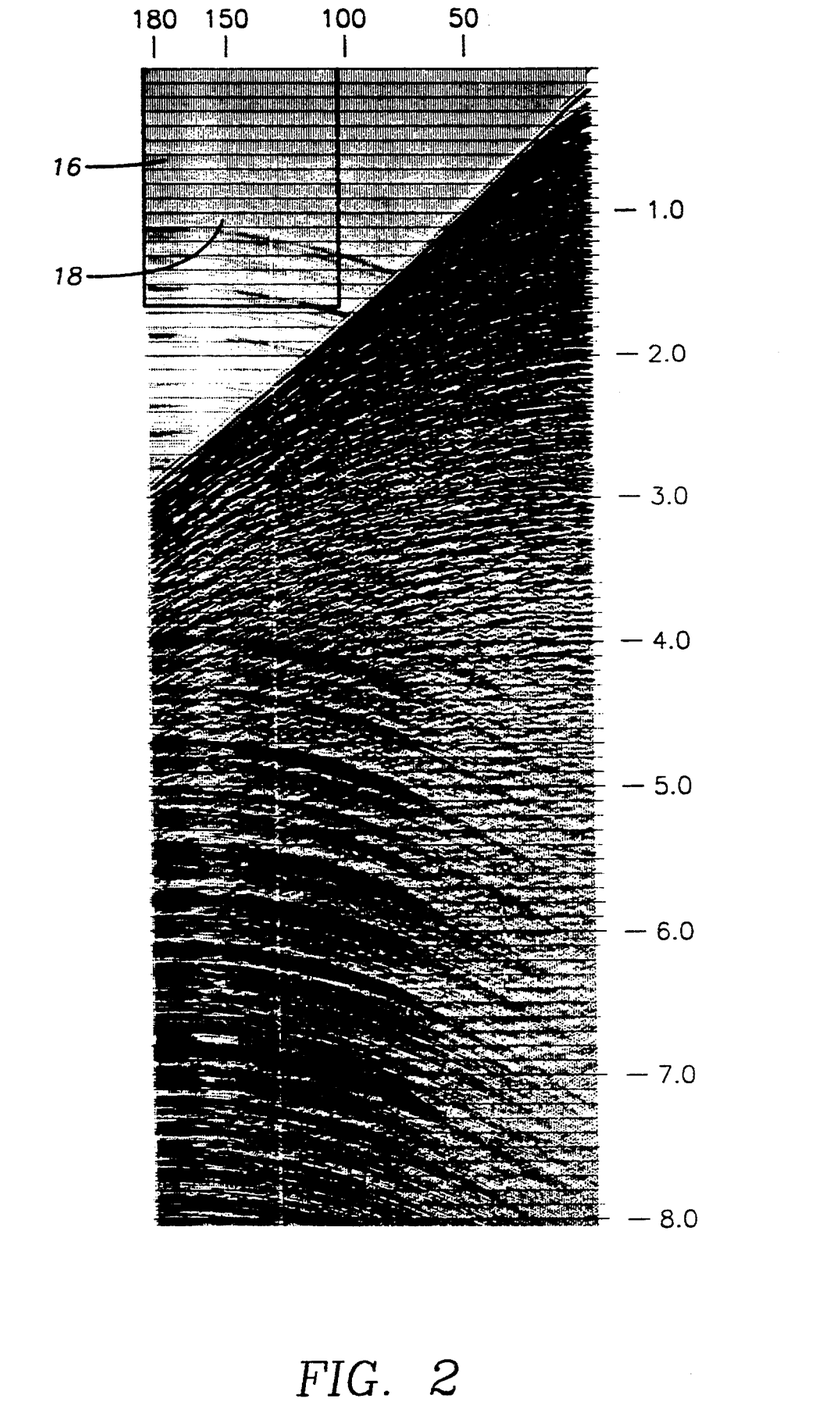
FIG. 2 is a field recording of a noisy multichannel seismic data recording.

FIG. 2 shows a multitrace seismic recording having a finite time duration vertically, of 8.4 seconds. The recording has a spatial extent horizontally across 180 traces of about 4500 meters with a spacing of 25 meters between traces. Desired seismic events begin at about 0.130 second at the right hand side and at about 2.910 seconds on the left hand side. The desired seismic events are hyperbolas that crest beneath the first trace at the right, sloping towards the left. Severe noise bursts continuously interfere with the desired seismic data. The noise bursts are hyperbolas that crest near trace 180, sloping to the right and obscuring the deep-lying seismic events. The noise is due to a nearby large tanker sailing along and parallel to the line of survey. The tanker's screw, which was probably turning at about 45 RPM, is probably the noise generator. The apparent relative change in amplitude of the noise is due to the use of time-varying gain in the seismic recording equipment which suppresses the initially-arriving high-amplitude seismic events. The absolute amplitude of the noise is substantially constant.

Let us consider the use of ANC to remove the noise of FIG. 2. First we must somehow get a reference noise measurement in order to design a suitable stable filter. Second, we must devise a way to provide filter coefficients that have both temporal and spatial continuity. Third, we must be able to extract the reference noise from the recording itself. The method next to be described is restricted to be applicable to noise wavefields of the type as above characterized.

We begin by establishing a noise analysis window 16 over a region on the multitrace seismic data recording where the noise wavefield can be clearly identified and correlatable across a set, including a sub-multiple of several traces of the multitrace seismic data recording. The analysis window encompasses a desired number of data-sample intervals along the temporal dimension and, along the spatial dimension, a selection of as many traces as remain uncontaminated by the later-arriving desired seismic signals. In FIG. 2, a characteristic noise event 18 is clearly seen on the selected set of traces that stretch across about a third of the multitrace seismic recording in the quiet zone ahead of the seismic arrivals. But the noise interference stretches across the entire recording. Therefore, to produce a model of the entire envelope of the noise wavefield we must extrapolate noise event 18 across the remainder of the spatial extent of the recording, to the traces that were not selected for the noise analysis window. We can do that provided we first establish the noise source location.

Figure 3:
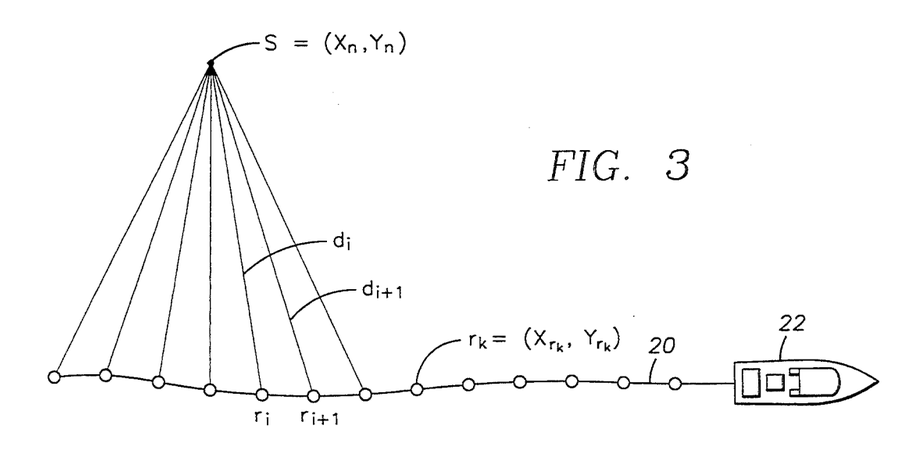
FIG. 3 is a schematic drawing showing the geometry of the source-receiver array for defining the inter-trace time differentials.

With the aid of a cross correlation algorithm of any well-known type, measure the time shifts $\Delta t_i$ between adjacent trace segments where $i = 1, \ldots, N$ and N is the number of traces selected for inclusion in the analysis window. Referring to FIG. 3, S is the location of a noise source having coordinates $x_i$, $y_i$. Receiver locations along seismic streamer 20 (which is being towed by ship 22) are designated as $r_i$. The distance between source S and the respective receivers $r_i$ are represented by $d_i$. The stepout time between a trace i and a trace $i+1$ is $\Delta t_i$. Therefore, $$\Delta t_i = t_{i+1} - t_i = (d_{i+1} - d_i)/v,$$

where v is the speed of sound in water, and $$d_i^2 = (x_n - xr_i)^2 + (y_n - yr_i)^2.$$

A key reference trace $r_k$ is selected from one of the trace segments selected in the analysis window. The quantities $\Delta t_i$ are summed to define the measured differential travel time or stepout $\Delta tk_j$ ($j = 1, \ldots, i$) between $r_k$ and any other selected trace, i, in the analysis window. The measured differential travel times define, within the analysis window, a segment of the hyperbolic stepout curve.

The noise location in terms of coordinates $x_n$, $y_n$ may be estimated by use of a least squares inversion of any well known type such as an extended, iterated, Kalman filter, to minimize the formulation $$\sum_{j=1}^{N-1} (\Delta tk_j - \Delta \tau k_j)^2 \rightarrow \text{minimum},$$

where $\Delta \tau k_j$ represents a predicted time differential.

As may be seen from the lower part of FIG. 2, the undesired noise extends across the entire multitrace seismic recording. Since we now know the coordinates of the noise source, we can now extrapolate a stepout curve representing the noise envelope across the array of traces that were not originally selected for the analysis window. Thus, from a combination of the measured and calculated time differentials, we can assign a discrete time differential to every trace of the multitrace seismic recording.

A reference noise model for the multitrace recording is constructed for a position $r_k$ by first selecting one of the trace segments from the analysis window and appending it to itself a plurality of times to generate a trace as long as the preselected time duration of the seismic recording which in FIG. 2 is 8.4 seconds. The noise model for each other trace is obtained by linearly shifting the $r_k$ model up or down by the amount of the appropriate time differential $\Delta tk_j$ assigned to each of those other traces with respect to the reference trace.

Using any well-known adaptive noise cancellation (ANC) filter calculation routine for an adaptive filter such as a Weiner filter, calculate the filter coefficients for each time sample of the first-trace noise model. Store the coefficients in an ANC memory. If the filter is 50 samples long and if the trace includes 1000 samples, then there are 1000 sets of stored filter coefficients, 50 values per set. For a second noise model trace for example, linearly shift the ANC memory up or down in the amount of the assigned time differential for that trace. Repeat the shifting process for all of the remaining traces embraced by the multitrace seismic data recording.

For each trace except the first, the final filter coefficients to be used at each time sample are a linear combination of the average of the filter coefficients from a previous sample interval of that trace and the filter coefficients for that sample from an immediately preceding trace. That procedure causes the filter to be characterized by both spatial and temporal continuity. The concept is illustrated below, where each quantity $F_m$ represents a set of filter coefficients for sample m:

Trace i:     $F_1$  $F_2$  $F_3$   $F_4$   $F_5$
                              ↓
Trace $i + 1$:  $F_1$  $F_2$  $F_3 \rightarrow$  $F_{(F3/2)+F4/2)}$.

Thus, the coefficient for sample $F_4$, is the average of the value of the coefficient for sample $F_3$ from trace $i+1$ and the value of sample $F_4$ from trace i. A weighted average could also be used to provide some other desired fractional combination of coefficients to implement some other desired adaptation convergence routine. The remaining samples for the remaining traces are processed sequentially in like manner.

Figure 4:
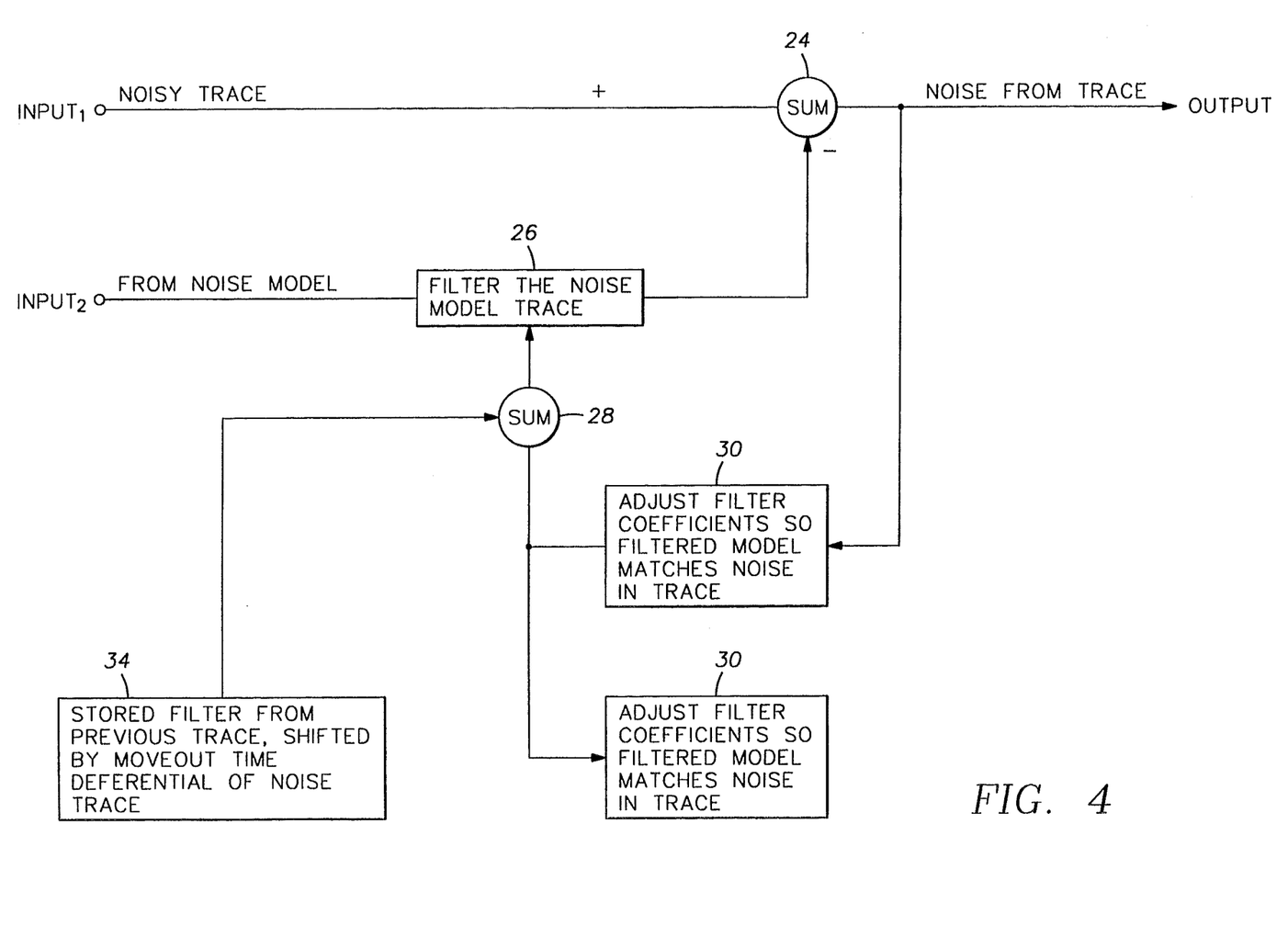
FIG. 4 is a schematic diagram of the mechanization of the modified adaptive noise cancellation filter.

The so-designed filter is applied to the data as outlined in FIG. 4. A noisy trace is input to the positive input of summing junction 24. The noise model, derived as earlier described, is input to adjustable filter 26. The output of filter 26 is applied subtractively to the incoming data at the negative input to junction 24, the output of which is iteratively fed back through summing junction 28 after passage through a conventional coefficient adjustment means 30 until the filter coefficients converge to a minimum. The coefficients are stored in ANC memory 32 for combination with the next sequential trace. The stored coefficients from ANC memory 32 for a previous trace are shifted in proportion to the inter-trace stepout in shifter 34 whence the coefficients are averaged for application to adjustable filter 26.

Figure 5:
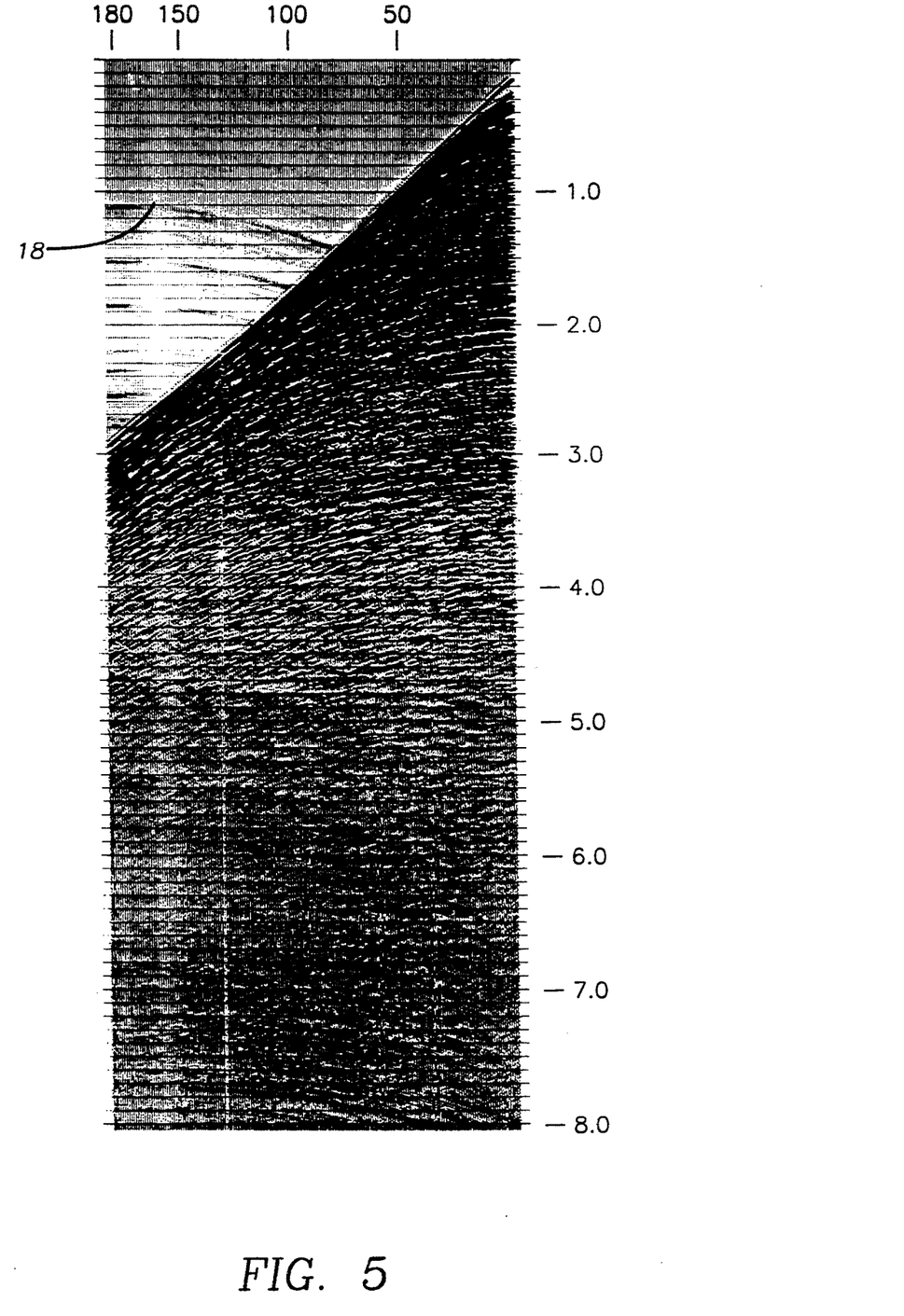
FIG. 5 is the recording of FIG. 2 after application of the modified filter of FIG. 3.

FIG. 5 is an example of the results of applying a filter designed according the precepts of this disclosure. A small amount of residual noise, whose stepout envelope differs from that of the primary noise wavefield, remains deep in the recording.

This invention necessarily has been described with a certain degree of specificity for purposes of example only but not by way of limitation. The invention is limited only by the appended claims.

What is claimed is:

1. A method for removing an undesired noise wavefield, emanating from a source, from desired events recorded on a multitrace seismic recording having a preselected temporal duration, the multiple traces defining a spatial expanse, comprising:

(a) defining a noise-analysis window of predetermined time duration within said multitrace seismic recording, said noise-analysis window including samples of said undesired noise wavefield that are uncontaminated by desired seismic events, said samples being correlatable across a selected set of traces from said multitrace seismic recording;

(b) choosing a segment from one of said selected set of traces within said noise analysis window as a reference segment and measuring the time differentials between correlatable noise samples appearing on said reference segment and segments of each of the others of said set of traces within said noise-analysis window;

(c) determining the noise source location from the measured time differentials and extrapolating time differentials for said identifiable noise samples from said source location to the non-selected traces of said multitrace seismic recording;

(d) appending said reference noise segment to itself a plurality of times to synthesize a reference noise-model trace that has a length equal to said preselected time duration;

(e) creating a multitrace noise model for said multitrace seismic recording by repeatedly linearly shifting said reference noise-model trace relative to itself by an amount corresponding to the time differentials, relative to said reference trace to each of the traces of said multitrace seismic recording;

(f) from said multitrace noise model, adaptively calculating a filter whose coefficients are characterized by temporal and spatial continuity; and (g) applying said calculated filter to said multitrace seismic recording.

2. A method for adaptively filtering a multitrace recording of seismic data samples having a time duration extending over a preselected number of sample intervals, to remove noisy coherent data samples from desired seismic events, the noise emanating from a single source, comprising:

(a) defining an analysis window that encompasses a preselected number of sample intervals along a temporal dimension of said multitrace seismic recording and a selected set of trace segments along a spatial dimension of said seismic recording, the boundaries of the analysis window being chosen to display correlatable noise samples that are uncontaminated by desired seismic events;

(b) selecting a trace segment from said set to form a reference trace segment;

(c) cross-correlating said reference trace segment with each subsequent trace segment of said set encompassed by the analysis window to measure a plurality of time differentials between said reference trace segment and said subsequent trace segments;

(d) defining the location of said noise source from the plurality of measured time differentials using a least squares inversion algorithm;

(e) using the so-defined noise source location, extrapolating the time differentials corresponding to the remaining traces of the multitrace seismic recording that were not included within the confines of said analysis window;

(f) appending said reference segment to itself a plurality of times to build a reference trace representing a reference noise model extending over the same number of sample intervals in the temporal dimension as encompassed by said multitrace seismic recording;

(g) calculating a set of filter coefficients for each sample of said reference trace and storing said filter coefficients in memory slots in sequential order by sample-interval number;

(h) for a subsequent trace, (1) linearly time-shifting the stored filter coefficients in the amount of the time differential corresponding to the spatial location of that trace relative to said reference trace and (2) for each sample interval for said subsequent trace, computing a new filter coefficient by combining a predetermined fraction of the filter coefficient from the previous time sample of that trace with a predetermined fraction of the filter coefficient from the shifted, stored filter coefficient of an immediately previous trace;

(i) generating a noise filter by repeating step (h) a number of times equal to the number of traces that make up the multitrace seismic recording; and (j) applying said filter to said multitrace seismic recording.

3. The method as defined by claim 1, wherein:
said time differential measurements are the result of a process of cross-correlating said reference segment with each of the other trace segments within said noise analysis window.

4. The method as defined by claim 3 wherein:
the noise source location is determined from the measured time differentials by employing an extended, iterated, Kalman filter algorithm.

5. The method as defined by claim 3, wherein:
the noise source location is determined from a least-squares inversion algorithm.

6. The method as defined by claims 4 or 5, wherein:
said temporal and spatial continuity is achieved by (a) sampling said multitrace noise model at desired sample intervals, (b) adaptively calculating noise filter coefficients for each sample interval for each trace of said multitrace noise model;

(c) for each sample interval of a selected trace of said multitrace noise model, averaging the filter coefficient from a previous sample interval of that trace with the filter coefficient for that sample interval from an immediately previous adjacent trace of said multitrace noise model.

7. A method for removing coherent environmental noise from a multitrace seismic data recording having a preselected duration and which consists of a plurality of discrete data samples, comprising:

within an analysis window, identifying components of an uncontaminated coherent noise wavefield resident on a set of traces selected from said multitrace seismic data recording;

defining a reference trace segment, within said analysis window, from among said set of traces and determining the stepout times relative to the reference trace, to the wavefield noise components resident on each trace of the set;

with the aid of said stepout times, determining the location of the source of said coherent environmental noise;

from the source location, extrapolating stepout times for noise wavefield components to the non-selected traces of said multitrace seismic data recording;

defining a reference noise trace by appending said reference segment to itself a number of times sufficient to equal said time duration;

adaptively calculating a set of filter coefficients for said reference noise trace and storing said set filter coefficients as a function of sample interval;

linearly shifting the stored set of filter coefficients in the amount of the stepout time between said reference noise trace and a subsequent trace;

calculating a set of filter coefficients for a selected sample of said subsequent trace by linearly combining the filter coefficient from the previous sample of said subsequent trace with the stored, shifted filter coefficient for the selected sample from the previous trace;

repeating the above steps of linearly shifting, calculating and combining between a previous trace and a subsequent trace for all of the remaining traces of said multitrace seismic data recording to formulate a noise filter; and applying said noise filter to said multichannel seismic data recording.

* * * * *

UNITED STATES PATENT AND TRADEMARK OFFICE
CERTIFICATE OF CORRECTION

PATENT NO. : 5,448,531
DATED : September 5, 1995
INVENTOR(S) : William H. Dragoset, Jr.

It is certified that error appears in the above-indentified patent and that said Letters Patent is hereby corrected as shown below:

Title page: and sheet 3, Figure 4 of the drawings:

On the lower right-hand box of the Figure, change "30" to --32--.
On the title page and sheet 3, Figure 4 of the drawings:
Delete the text in said box and substitute therefor:
  --STORE FILTER COEFFICIENTS AS A FUNCTION OF
     SAMPLE INTERVAL --

Signed and Sealed this

Fourth Day of February, 1997

Attest:

BRUCE LEHMAN

*Attesting Officer*        *Commissioner of Patents and Trademarks*